(12) United States Patent
Russell

(10) Patent No.: US 6,295,886 B1
(45) Date of Patent: Oct. 2, 2001

(54) VEHICLE SHIFT MECHANISM FOR AN AUTOMATIC TRANSMISSION

(75) Inventor: Ronald A. Russell, Whitehall, MI (US)

(73) Assignee: Dura Global Technologies, Rochester Hills, MI (US)

( * ) Notice: Subject to any disclaimer, the term of this patent is extended or adjusted under 35 U.S.C. 154(b) by 0 days.

(21) Appl. No.: 09/415,373

(22) Filed: Oct. 8, 1999

Related U.S. Application Data

(60) Provisional application No. 60/103,520, filed on Oct. 8, 1998.

(51) Int. Cl.⁷ ............................. F16H 59/02; G05G 9/00
(52) U.S. Cl. .................................. 74/473.18; 74/473.23; 74/473.28
(58) Field of Search ........................ 74/473.18, 473.23, 74/473.28

(56) References Cited

U.S. PATENT DOCUMENTS

| | | |
|---|---|---|
| 4,905,530 | 3/1990 | Stehle et al. . |
| 4,987,792 | 1/1991 | Mueller et al. . |
| 5,044,220 | 9/1991 | Raff et al. . |
| 5,062,314 | 11/1991 | Maier et al. . |
| 5,070,740 | 12/1991 | Giek et al. . |
| 5,150,633 | 9/1992 | Hillgartner . |
| 5,197,344 | 3/1993 | Maier et al. . |
| 5,622,079 | * 4/1997 | Woeste et al. ................ 74/473.18 X |
| 5,689,996 | * 11/1997 | Ersoy ............................ 74/473.18 X |
| 5,791,197 | 8/1998 | Rempinski et al. . |
| 5,870,929 | 2/1999 | Bravo . |
| 5,875,684 | 3/1999 | Bravo . |

FOREIGN PATENT DOCUMENTS 8-74977 * 3/1996 (JP) .

* cited by examiner

Primary Examiner—Allan D. Herrmann
(74) Attorney, Agent, or Firm—Peter McDermott

(57) ABSTRACT

A transmission shifter for controlling the transmission of a motor vehicle in both and automatic mode and a manual (or "autostick") shifting mode is disclosed, comprising a base having a detent surface provided with a series of detents, a cable actuator to which a cable would be connected to the transmission, a shifter lever connected to the base, movable along a first gear shift gate in the automatic mode and a second gear shift gate in the manual mode with the shift gates connected by a connecting gate, and a pawl mounted on the cable actuator, movable between an engaged position where the pawl engages the detent surface to a disengaged position where the pawl is free of the detent surface, such that as the shifter lever moves along the first gear shift gate the cable actuator moves with the shifter lever, and the shifter lever moves independent of the cable actuator as the shifter lever moves along the second gear shift gate. In certain preferred embodiments the shifter lever is mounted on a pivot block, pivotable along first and second pivots, and the shifter lever pivots along the second pivot to reach the second axis.

14 Claims, 15 Drawing Sheets

VEHICLE SHIFT MECHANISM FOR AN AUTOMATIC TRANSMISSION

This application claims priority under 35 USC §119(e) from commonly assigned, copending Provisional Application Ser. No. 60/103,520, filed Oct. 8, 1998, entitled VEHICLE SHIFT MECHANISM FOR AN AUTOMATIC TRANSMISSION.

FIELD OF THE INVENTION

The present invention is directed to shifters for motor vehicles, and more particularly, to a shifter which offers normal automatic shifting or electronic manual shifting.

BACKGROUND OF THE INVENTION

The subject matter of the instant invention relates to transmission shifters for motor vehicles, particularly so called "floor shifters", where the shifter is mounted on the floor or bottom pan of the motor vehicle. The instant invention can be employed to operate electronic and/or cable controlled transmissions. The shifters are used by vehicle operators to select the transmission mode of operation and in turn performance of the vehicle. Transmission shifters are well known in this art. Examples of conventional shifters are described in U.S. Pat. Nos. 4,905,530; 4,987,792; 5,009,128; 5,044,220; 5,062,314; 5,070,740; 5,197,344; and 5,070,740; the disclosure of each of which is hereby incorporated by reference.

There is a need in this art for a transmission shifter that effectively operates electronic or cable controlled transmissions and, in some cases, transmissions having both electronic and cable controls. There is also a need in this art for a shifter that provides tactile feedback as to the operational position of the shifter, particularly as the shifter moves between automatic mode and electronic mode.

In view of the foregoing, it is an object of the present invention to provide a transmission shifter capable of alternating between cable control of the transmission and electronic control of the transmission which is of simple and elegant construction.

It is an additional object of at least certain preferred embodiments of the present invention to provide a transmission shifter for a motor vehicle having tactile feedback as to the operational position of the shifter. It is an additional object of the present invention to provide a transmission shifter for a motor vehicle, which is highly reliable in operation. Additional objects and optional features of the invention will be apparent from the following disclosure and detailed discussion of preferred embodiments.

SUMMARY OF THE INVENTION

The shifter of the instant invention solves problems associated with conventional shifters by providing a mechanism that is capable of operating electronic and/or cable controlled transmissions. The shifter of the instant invention can be employed in a conventional manner to position linearly an automatic transmission in Park (P), Reverse (R), Neutral (N), Drive (D) and in some cases Low (L). The inventive shifter can be converted from the conventional manner to an electronic shifter having a manual shift pattern. Electronic shifting with a manual shift pattern is sometimes referred to as "autostick". The shifter is operated in a conventional (i.e., cable-driven) manner about a first axis and converted to an electronic shifter by being operated about a second axis.

The inventive shifter can be employed in an automatic mode (cable controlled) and a manual mode (electronic actuated or controlled) as a result of having a primary and secondary axis of motion. It should be understood that the terms automatic, conventional or cable are used essentially synonymously when referring to the mode of the transmission shifter. Similarly, the terms electronic, manual or autostick are also used here are essentially synonymous. In preferred embodiments, the dual functioning shifter (cable/automatic mode and electronic/manual mode) satisfies the following operational criteria.

1) The automatic mode requires moving a cable typically during the fore/aft motion of the shifter lever (as a result of moving among P,R,N,D,L).

2) The cable exhibits no motion during the fore/aft motion of the control lever in the manual/electronic mode. The cable is maintained in position to prevent accidental motion from outside forces during manual mode.

3) Motion of the shifter lever about the secondary axis does not occur in any position except the position in which it is intended.

4) There is a tactile operator detection of the shifter position during secondary axis motion.

5) The shifter lever is retained in its secondary axis position when not moved by the operator.

6) The control lever is self-centering when in manual mode.

To satisfy these criteria, in accordance with one aspect the instant invention comprises a transmission shifter having a detent surface provided with a series of detents, a cable actuator, a shifter lever operatively connected to the base, movable along a first gear shift gate in automatic mode and a second gear shift gate in manual mode with the shift gates connected by a connecting gate, and a pawl mounted on the cable actuator, movable between an engaged position where the pawl engages the detent surface to a disengaged position where the pawl is free of the detent surface, wherein as the shifter lever moves along the first gear shift gate the cable actuator moves with the shifter lever, and the shifter lever moves independent of the cable actuator as the shifter lever moves along the second gear shift gate. Tactile detents may be molded unitary with the transmission cable actuator or the shift lever. By molding components multiple functions of the inventive shifter into unitary components, the cost of manufacturing the shifter assembly is reduced.

From the foregoing disclosure and the following more detailed description of various preferred embodiments it will be apparent to those skilled in the art that the present invention provides a significant advance in the technology and art of transmission shifters. Particularly significant in this regard is the potential the invention affords for reduced cost and simplified construction of transmission shifters offering the option of either automatic or autostick shifter control. Additional features and advantages of various preferred embodiments will be better understood in view of the detailed description provided below.

Figure 1:
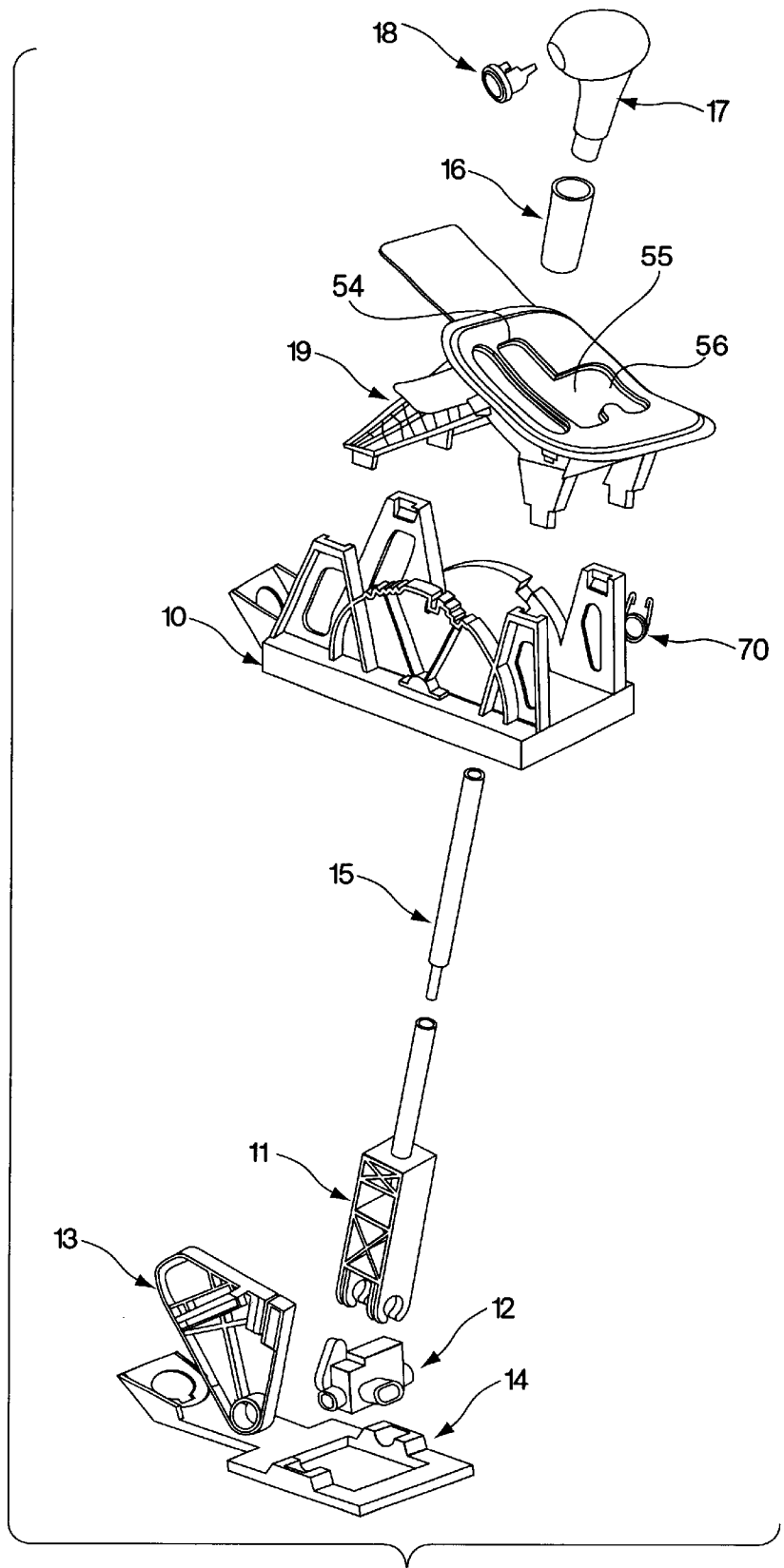
FIG. 1 is an exploded perspective view which illustrates a transmission shifter in accordance with a preferred embodiment.

It should be understood that the appended drawings are not necessarily to scale, presenting a somewhat simplified representation of various preferred features illustrative of the basic principles of the invention. The specific design features of the transmission shifter as disclosed here, including, for example, specific dimensions of the detent surfaces and the pivot block will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the transmission shifter illustrated in the drawings. In general, front or forward refers to the direction of the shifter lever as it moves toward the Park position shown in the drawings, and rear, rearward or backwards refers to a direction of the shifter lever as it moves away from the Park position.

DETAILED DESCRIPTION OF CERTAIN PREFERRED EMBODIMENTS

It will be apparent to those skilled in the art, that is, to those who have knowledge or experience in this area of technology, that many uses and design variations are possible for the transmission shifter disclosed here. The following detailed discussion of various alternative and preferred features and embodiments will illustrate the general principles of the invention with reference to a transmission shifter for use in controlling the transmission of a motor vehicle, and is particularly useful with a sport utility vehicle (SUV), or pickup truck. Other embodiments suitable for other applications will be apparent to those skilled in the art given the benefit of this disclosure.

Referring now to the drawings, FIG. 1 illustrates in exploded fashion a base 10, shifter lever 11, pivot block 12, cable actuator 13, and nose piece 14, formed as part of the base. Shifter lever 11 is attached to pushrod 15 (that is fabricated from a metal such as hardened steel) which is surrounded by shroud 16. The distal end of shift lever 11 is attached to knob 17 that houses button 18. The shifter can be assembled by any expedient manner. One such manner comprises attaching a sub-assembly comprising the button 18, knob 17, shroud 16, pushrod 15, and lever 11 to pivot block 12. The cable actuator 13 is also attached to the pivot block 12. The pivot block 12 is located upon channels or grooves defined in nose piece 14. The base 10 is positioned over and around nose piece 14 such that the sub-assembly extends upwardly through the base 10. The base 10 defines channels or grooves that mirror the channels/grooves in the nose piece 14 and when the base 10 and nose piece 14 are joined retain the pivot block 12 at a predetermined location while allowing the previously described dual axis movement. Bezel 19 is then positioned upon the base 10.

Recent developments in automotive shifters and electronics have created a need in this art for a transmission shifter having a shifter lever with two axes of motion while maintaining single axis of motion for the lever driving a shift cable. A key aspect of providing such motion comprises affixing the shifter lever to the pivot block. The shifter lever 11 is engaged by the operator of the motor vehicle to effect shifting of the gears of the transmission. The cable actuator 13 is adapted to receive a cable connected to the transmission. Numerous suitable alternative cable attachment techniques can be employed and will be readily apparent to those skilled in the art given the benefit of this disclosure. Motion of the cable actuator results in motion to the cable which in turn controls the gears of the transmission when the transmission shifter is in automatic mode. The shifter lever 11 is seen to be movable forward and rearward within a bezel assembly 19 along a first gear shift gate 54 during automatic mode, through a connecting gate 55 (about a second axis) to a second gear shift gate 56 for manual or autostick mode.

Figure 2:
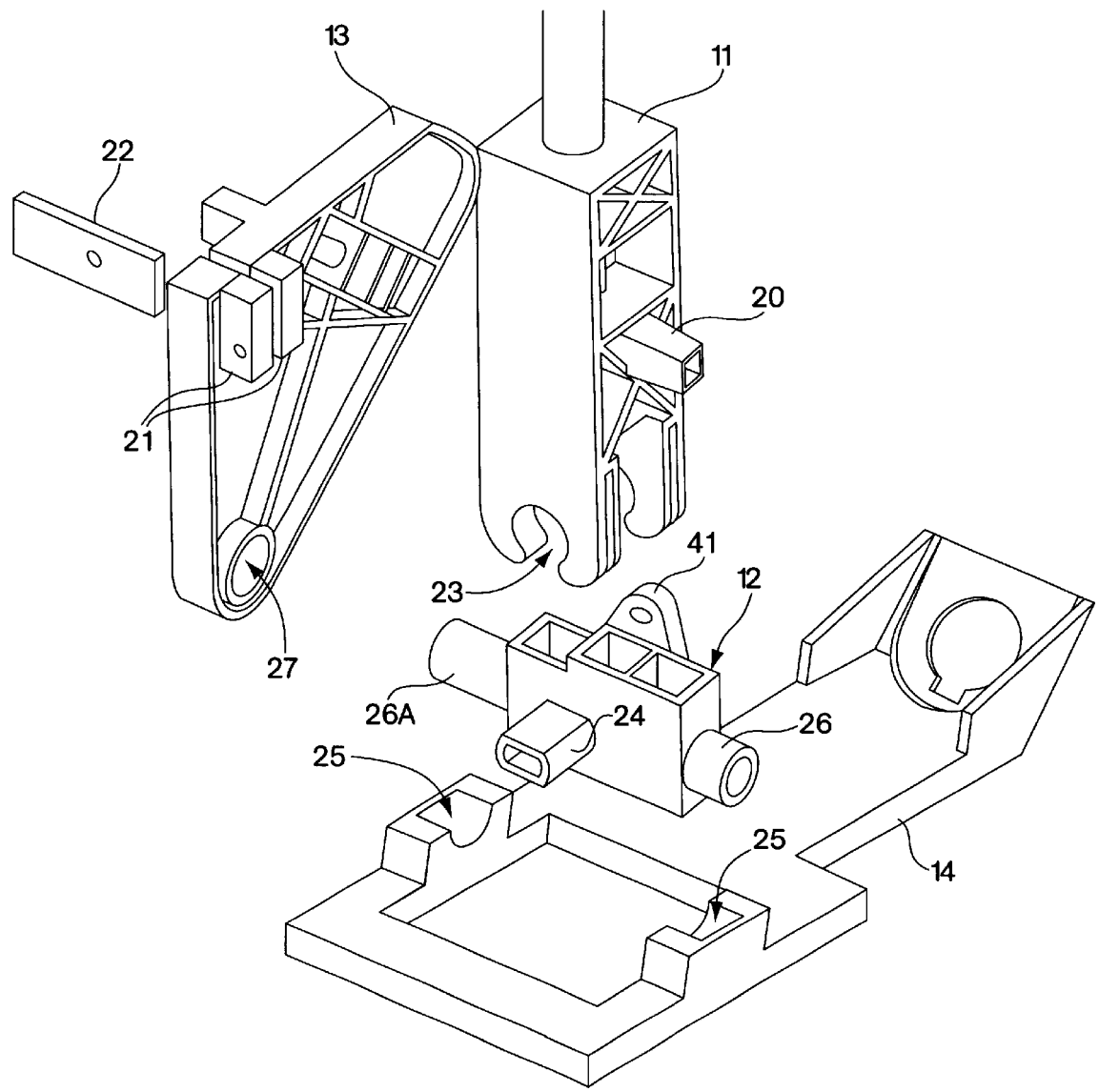
FIG. 2 is another exploded perspective view illustrating the interconnection among certain components of the shifter, including the pivot block, shown in FIG. 1.

FIG. 2 illustrates in greater detail the aforementioned sub-assembly. Further to the above description, shifter lever 11 includes a preventor post 20 (described below in greater detail). Shifter lever 11 defines grooves 23 that mate with protuberances 24 of pivot block 12. Shifter lever 11 is mated with the protuberances 24 by placing the lever 11 around the pivot block 12 rotating the lever 11 approximately 90 degrees (with respect to the plane of the drawing) and sliding the lever 11 onto the protuberances 24 thereby locking grooves 23 onto the protuberances 24. Extensions 26A and 26 of pivot block 12 are positioned upon nose piece 14 within grooves 25. Cable actuator 13 is attached to pivot block 12 via an opening 27 defined within the cable actuator 13. Opening 27 mates in a journalled fashion with extension 26A. Cable actuator 13 includes engagement tabs 21 and pawl 22 (described below in greater detail) that permit converting from automatic to manual electronic shifter operation.

Figure 3:
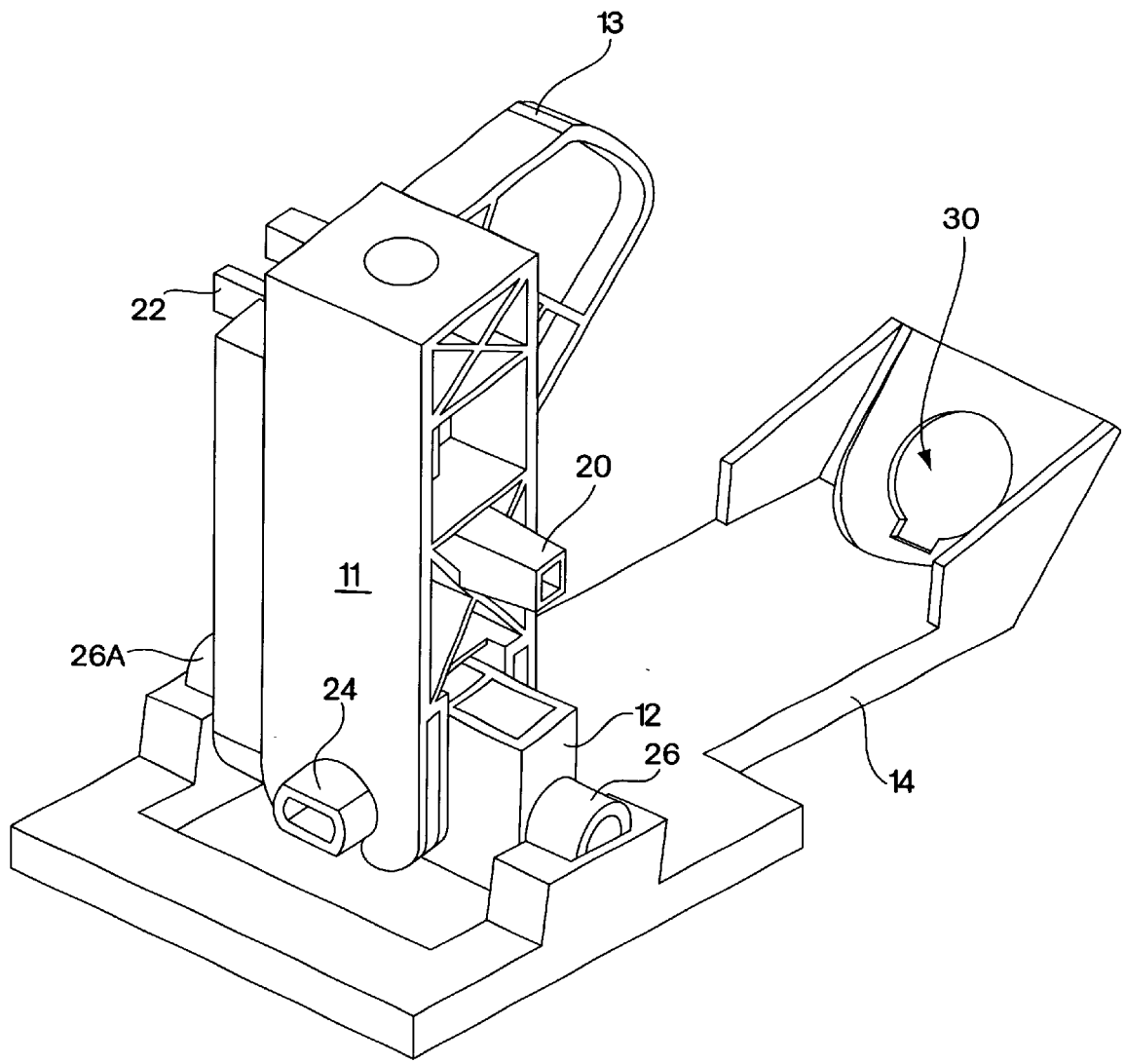
FIG. 3 is a perspective view illustrating certain components of FIG. 2 as assembled.

FIG. 3 illustrates the components of FIG. 2 in an assembled state. FIG. 3 also illustrates opening 30 defined in nose piece 14. Opening 30 can be employed for mounting the shifter onto the vehicle or other useful function.

Figure 4:
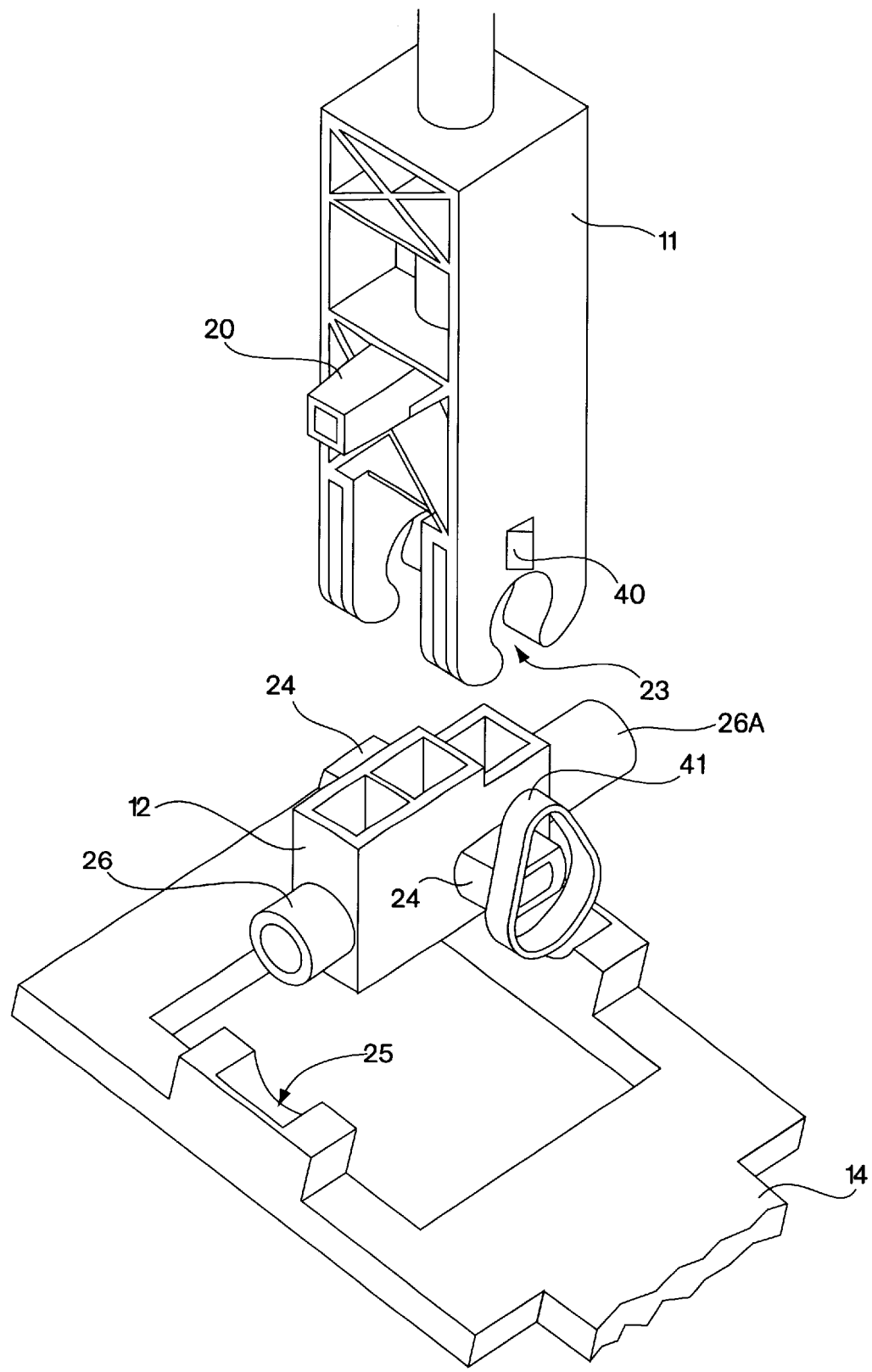
FIG. 4 is an exploded perspective view of the components of the shifter shown in FIG. 2.

FIG. 4 illustrates the sub-assembly shown in FIGS. 2 and 3 when viewed from the end of nose piece 14 that defines opening 30. Shifter lever 11 includes a tab 40 that functions as a secondary axis tactile indicator. Tab 40 can contact another protuberance 41 on pivot block 12. When tab 40 contacts protuberance 41 during movement of the shifter lever between automatic and manual transmission modes a vibration or force is transmitted through shifter or control lever 11 which can be sensed tactilely by the vehicle operator.

Pivot block 12, as seen in FIGS. 1–4, is a generally rectangular shaped block with extensions that provide for pivoting about a first pivot and a second pivot, and provide the axis for shifter lever pivots. As seen in FIG. 2, the primary axis of pivot or motion is along extensions 26, 26a of the pivot block 12 that are arranged in cross-car fashion (perpendicular to the longitudinal axis of the motor vehicle) and received by grooves 25 in the nose piece 14 of mounting base 10. Both the pivot block 12 and the shifter lever 11 rotate about this axis. In addition to the shifter lever, the transmission cable actuator 13 pivots on one of the cross car extensions 26a of the pivot block, so that it is functionally connected to the pivot block 12.

The secondary axis of pivot or motion is employed when moving the shifter over to operate in the electronic/manual (autostick) mode. In autostick mode, the shifter lever 11 is free to move fore and aft without moving or engaging the transmission cable. Such fore and aft movement occurs while in electrical connection with a transmission control system wherein the movement generates a signal from position sensors that in turn emit a pulse that affects a change in transmission functioning. The transmission shifter can interface with the gears of the transmission in the manner described in the U.S. Patents referenced above.

The inventive shifter disclosed here can include a mechanism that permits the operator to detect tactilely the mode of operation as a function of shifter lever position. This enables the operator to detect when a gear has changed during movement of the shifter lever in automatic mode, or when the shifter has been converted from cable to electronic control.

Figure 5:
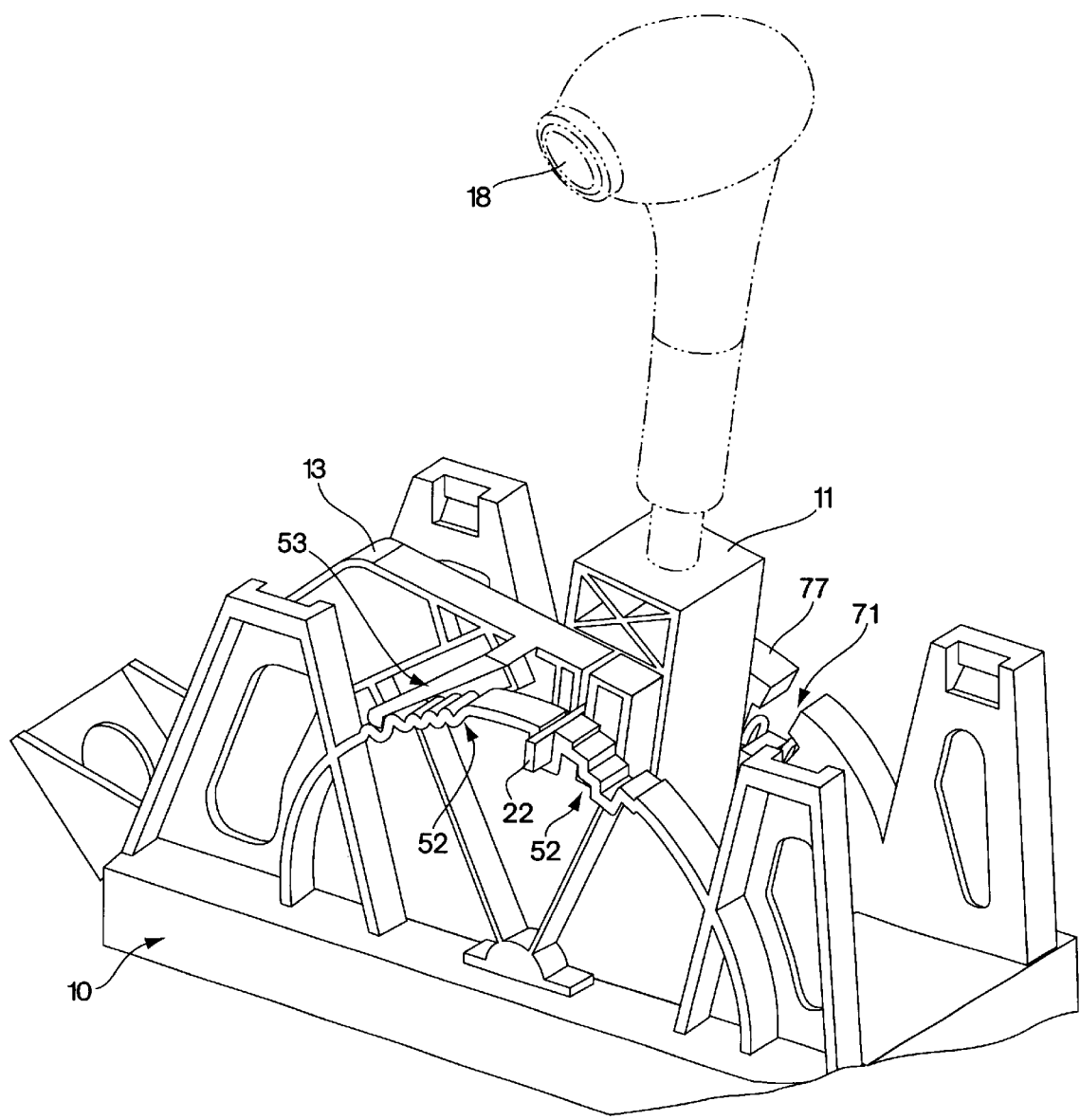
FIG. 5 is a perpsective view of the shifter shown in FIG. 1 in a Park (P) position.

FIG. 5 illustrates the components of FIGS. 1–4 in an assembled state and in a P (park) position. Base 10 is mounted around and upon nose piece 14 wherein lever 11 extends upwardly from the base and nose piece. FIG. 5 also illustrates the exterior portion of channels 51 that cooperate with channels 25 (within the nose piece 14) to position the pivot block 12. Pawl 22 engages detent 52 and prevents movement unless and until the pawl 22 has been disengaged. Detent 52 also engages primary tactile indicator 53, which in one preferred embodiment of the invention, is mounted on cable actuator 13. As described above, cable actuator 13 is mounted on pivot block 12 such that when shifter lever 11 is moved (when in the cable controlled automatic mode), the movement is transferred through the pivot block 12 to cable actuator 13 and indicator 53. The vibration or force generated by indicator 53 as it passes across detents 52 is transmitted to lever 11 thereby providing tactile position information to the vehicle operator.

Figure 6:
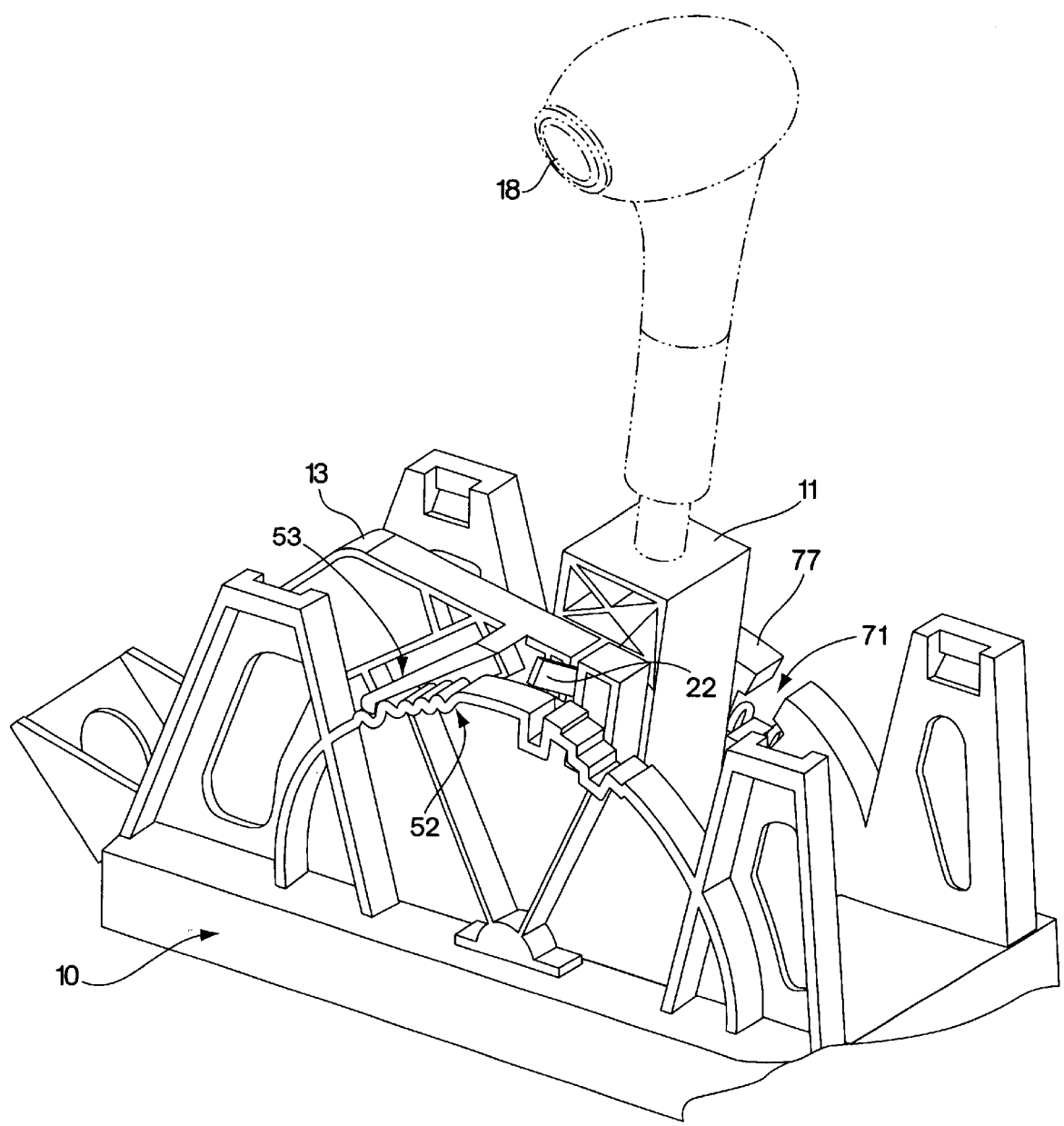
FIG. 6 is a perpsective view of the shifter shown in FIG. 5 in the Park position and unlocked.

FIG. 6 illustrates the assembly of FIG. 5 wherein pawl 22 has been disengaged by depressing button 18 in knob 17. Preferably when the shifter lever is in automatic mode the shifter lever receives the pawl in an opening having close tolerances with an end of the pawl. By depressing button 18 a force is applied to pushrod 15 (within lever 11) that in turn causes pawl 22 to move upwardly and away from detents 52. Once the pawl 22 has been disengaged the lever 11 is free to move fore and aft thereby permitting the vehicle operator to select the desired transmission function. Optionally a spring mounted on the cable actuator, a catch or other suitable mechanism readily apparent to those skilled in the art given the benefit of this disclosure can be used to releasably retain the pawl 22 against the detent so that when the pawl is not used the pawl remains in the detent it was last moved to.

Figure 7:
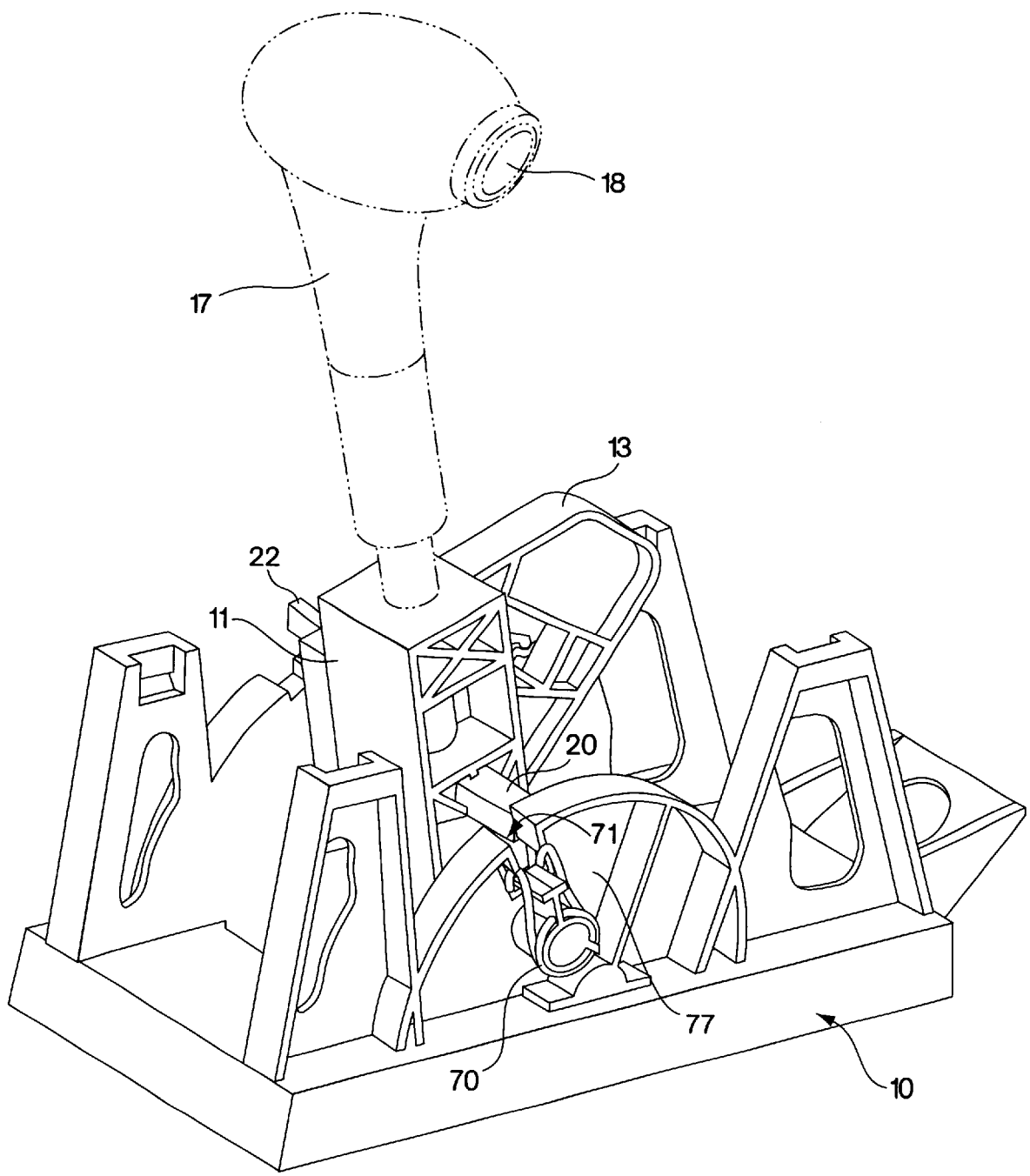
FIG. 7 is a perspective view showing the shifter moved to a Reverse (R) position.
Figure 8:
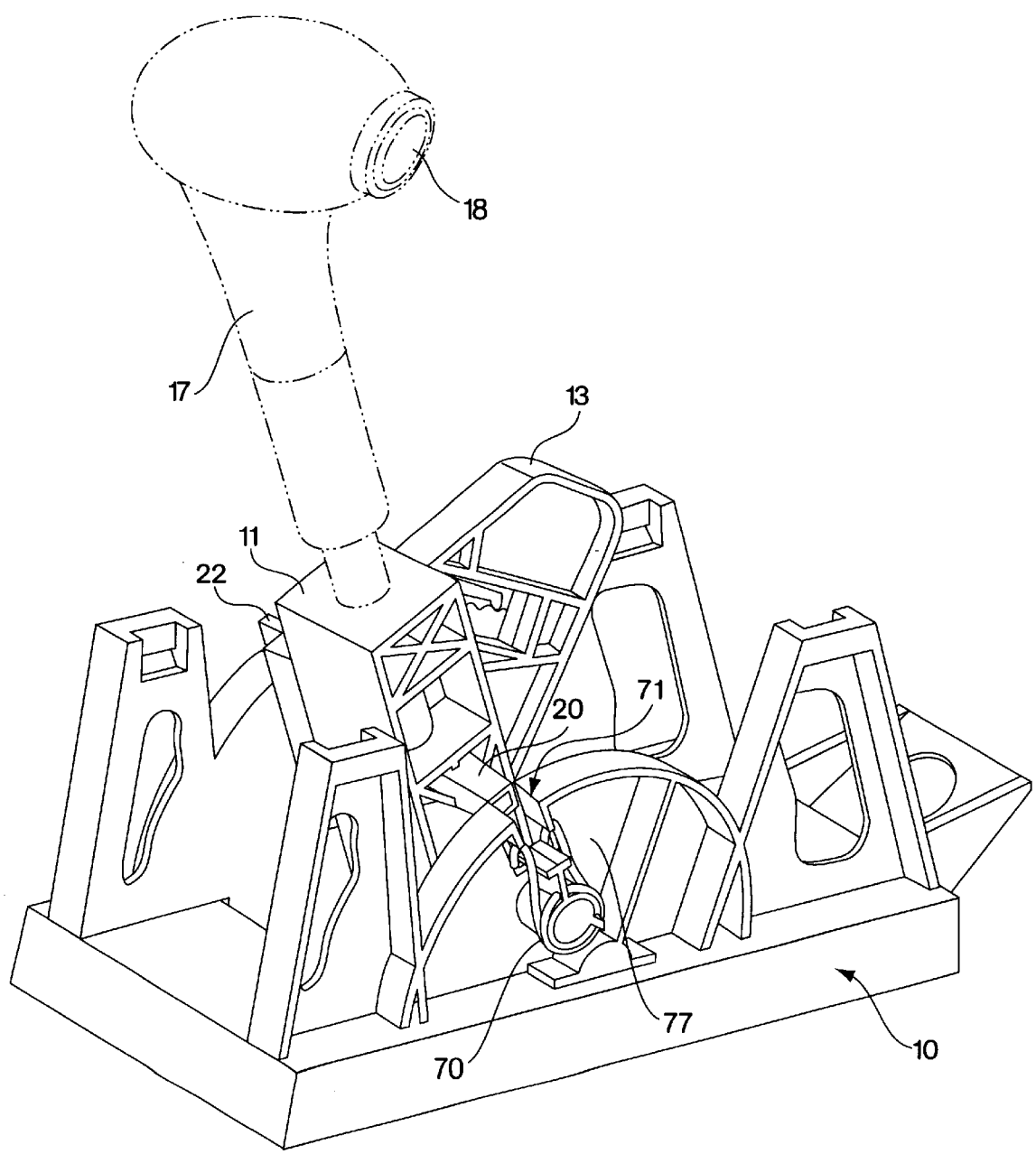
FIG. 8 is a perspective view showing the shifter moved to the Drive (D) position, where the shifter lever is free to pivot to the side at the operators discretion.
Figure 9:
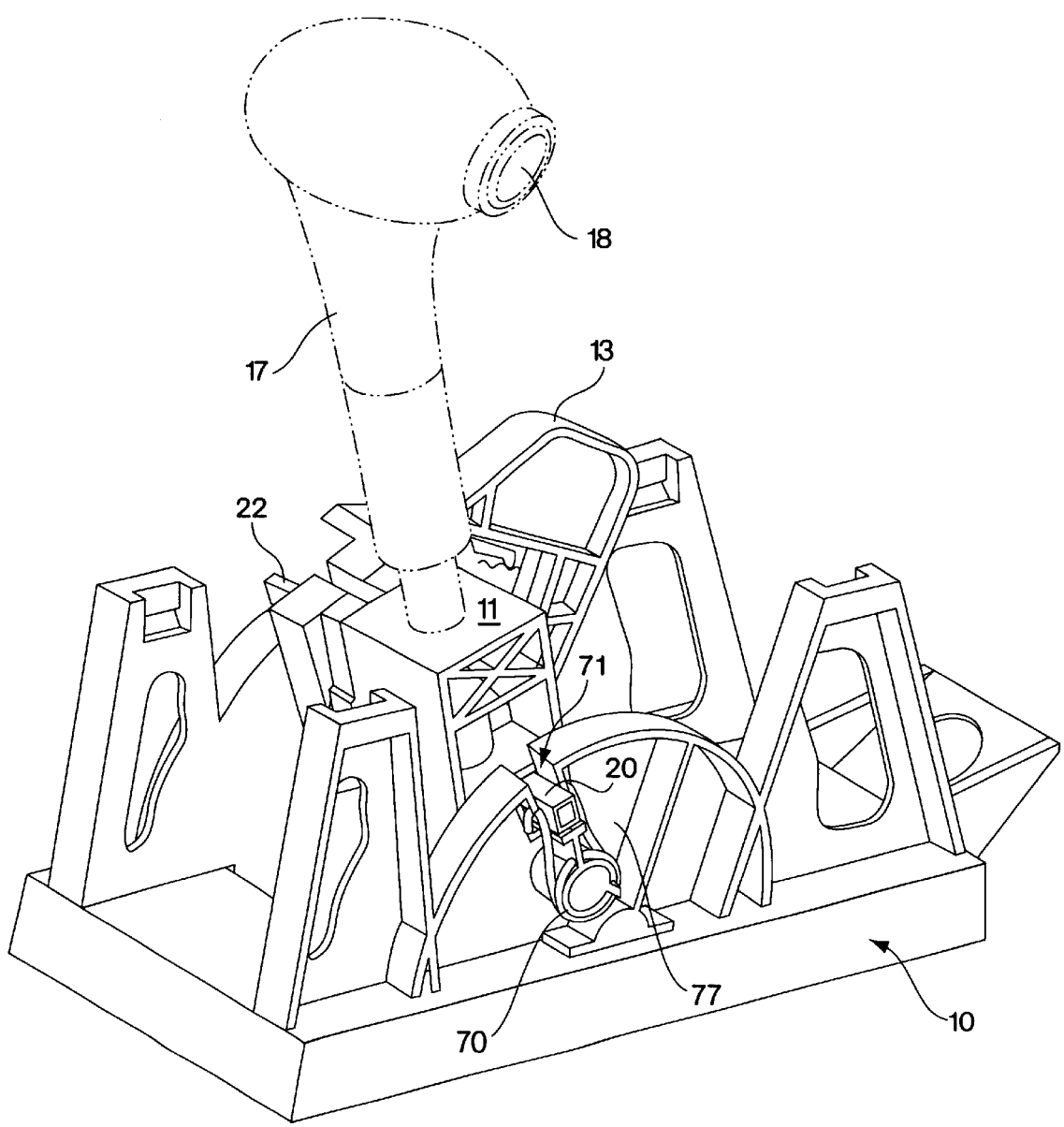
FIG. 9 is a perspective view showing the shifter moved into electronic or manual (autostick) mode.

FIG. 7 illustrates the assembly of FIGS. 5 and 6 (from a view 180 degrees from FIGS. 5 and 6), wherein the shifter lever is in Reverse (R) position and preventor post 20 prevents the shift lever 11 being moved from automatic mode into electronic/manual mode. Once in the D automatic position, the shifter is converted into electronic/manual mode by laterally moving the lever 11 such that preventer post 20 enters slot 71 defined within base 10. FIGS. 7–9 also illustrate electronic/manual mode centering spring 70. Spring 70 centers the lever 11 when in electronic mode between upshift and downshift positions. FIG. 8 illustrates the assembly of FIG. 7 immediately prior to the conversion from automatic to electronic mode. FIG. 9 illustrates the assembly of FIG. 7 once in electronic mode.

In automatic mode the control lever 11 and cable actuator 13 are locked together by means of tabs 21 on the actuator 13 engaging a corresponding recess 80 in the control or shifter lever 11. The operator depresses the button release 18 which (as seen in FIG. 1) by means of the interconnecting pushrod 15 moves the pawl 22, and unlocks the shifter lever 11 from detents 52 in the base 10 of the shifter. (Refer to FIGS. 5 and 6, discussed above.) The shifter lever can now be moved about the primary or first axis and in turn cause a corresponding movement in the cable actuator 13, e.g., refer to FIGS. 2 and 7. The shifter lever 11 is prevented from moving in the secondary axis (cross car) by the preventer post 20 riding against a wall 77. (See FIGS. 7 through 9).

Figure 10:
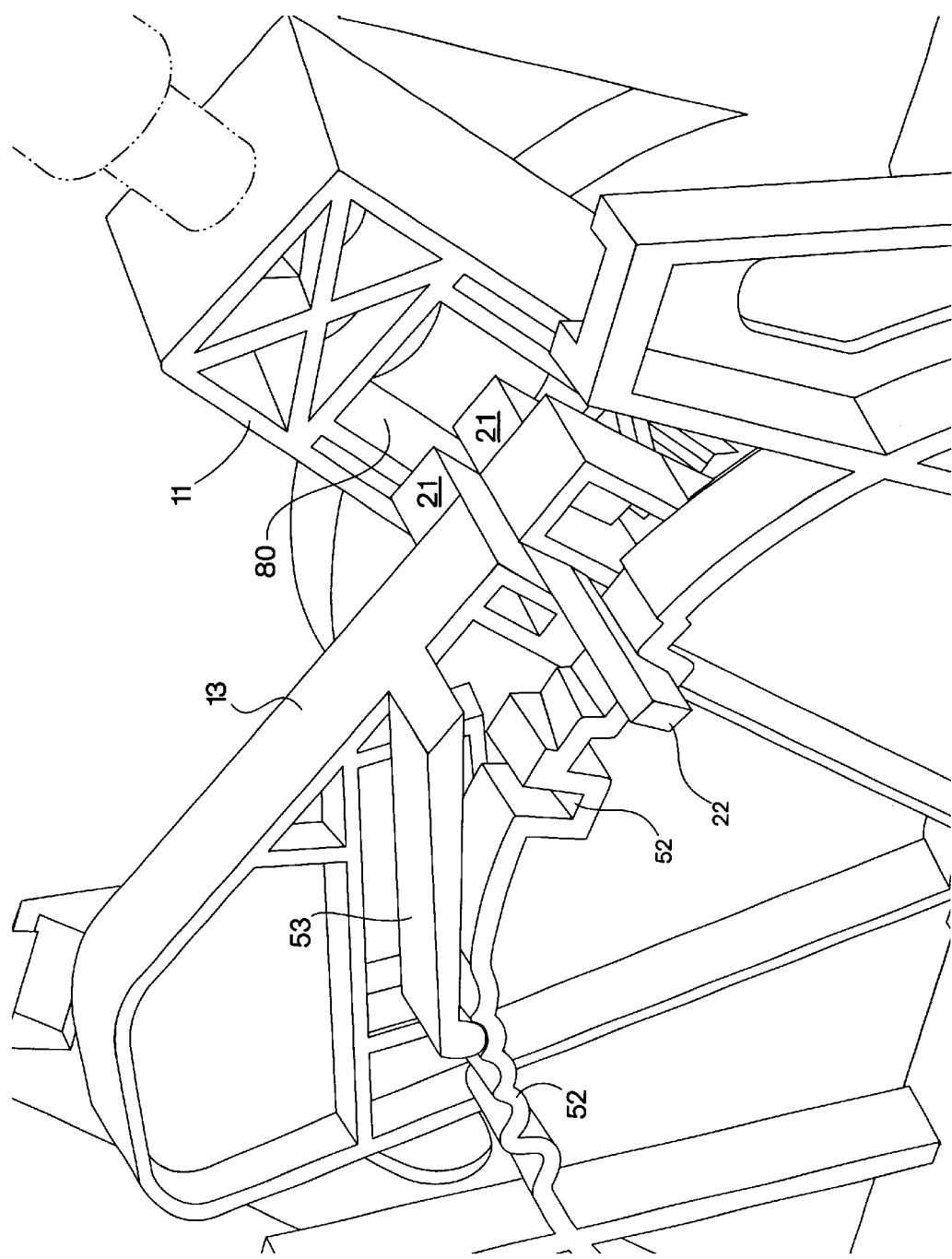
FIG. 10 is a perspective view of the shifter in the electronic mode focusing on the interconnection between the cable actuator and the shifter lever.

FIG. 10 illustrates the assembly of FIGS. 7 through 9 after the lever 11 has been laterally moved and is capable of being operated in the electronic mode. FIG. 10 illustrates the pawl 22, detents 52 and tactile indicator 53 held in the D (Drive) position thereby maintaining the cable and its attendant functions in D. FIG. 10 also illustrates lever 11 disengaged from the cable actuator 13 as a result of the lever 11 being distanced from engagement tabs 21 on cable actuator 13 (when engaged tabs 21 fit within lever 11 and cause the lever 11 and cable actuator 13 to move together). The lever 11 can re-engage tabs 21 by being moved laterally such that preventor post 20 exits slot 71, and tabs 21 re-enter lever 11. In accordance with a highly advantageous feature, pawl 22 is not mounted on the shifter lever 11. Instead, pawl 22 is pivotally mounted on the cable actuator 13. During manual mode, the pawl remains engaged with the detents 52, thereby locking the cable actuator in place (D).

Figure 11:
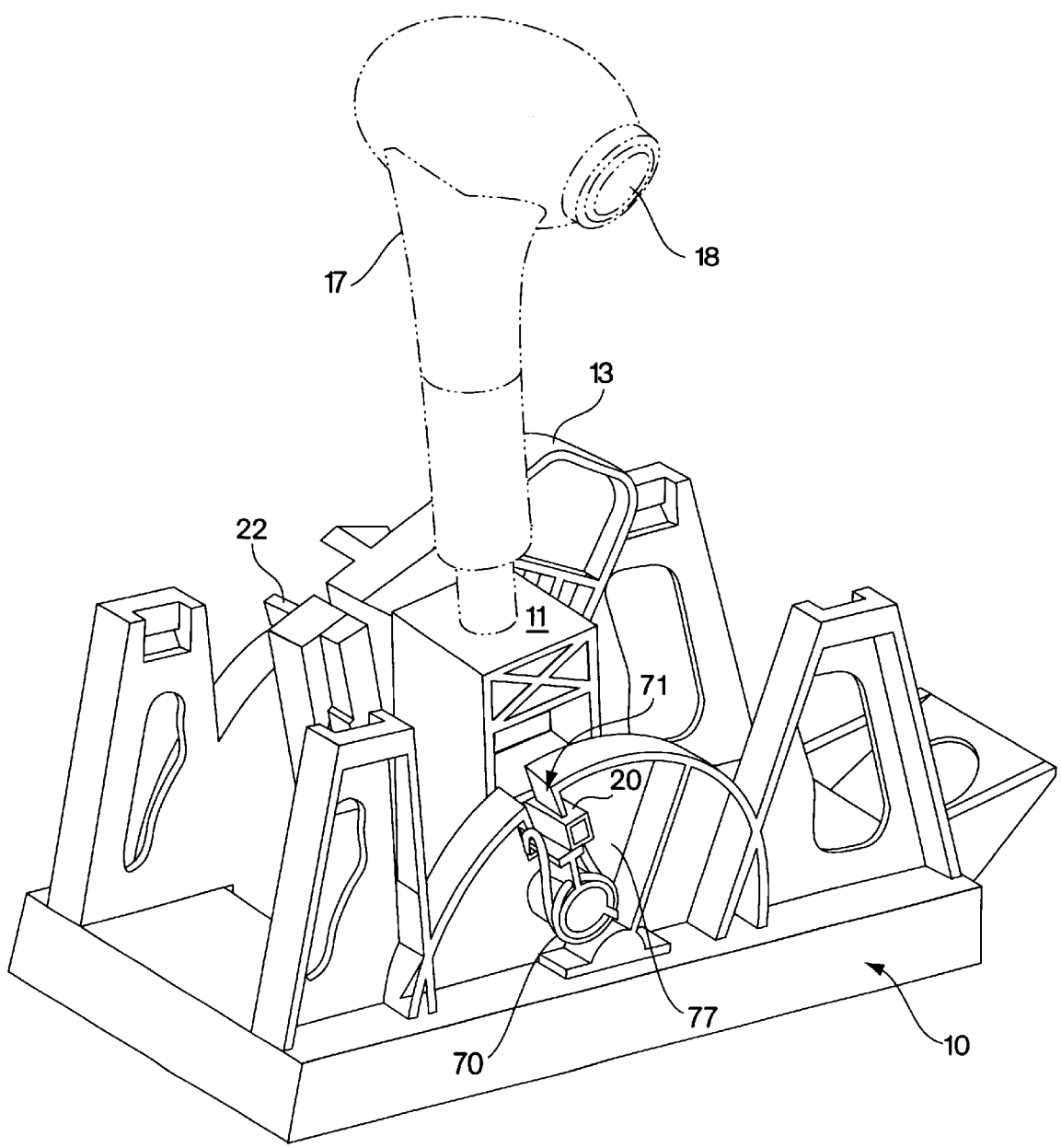
FIGS. 11 and 12 show a perpsective view of the shifter showing the lever moved forward to up-shift and downward to down-shift, respectively.
Figure 12:
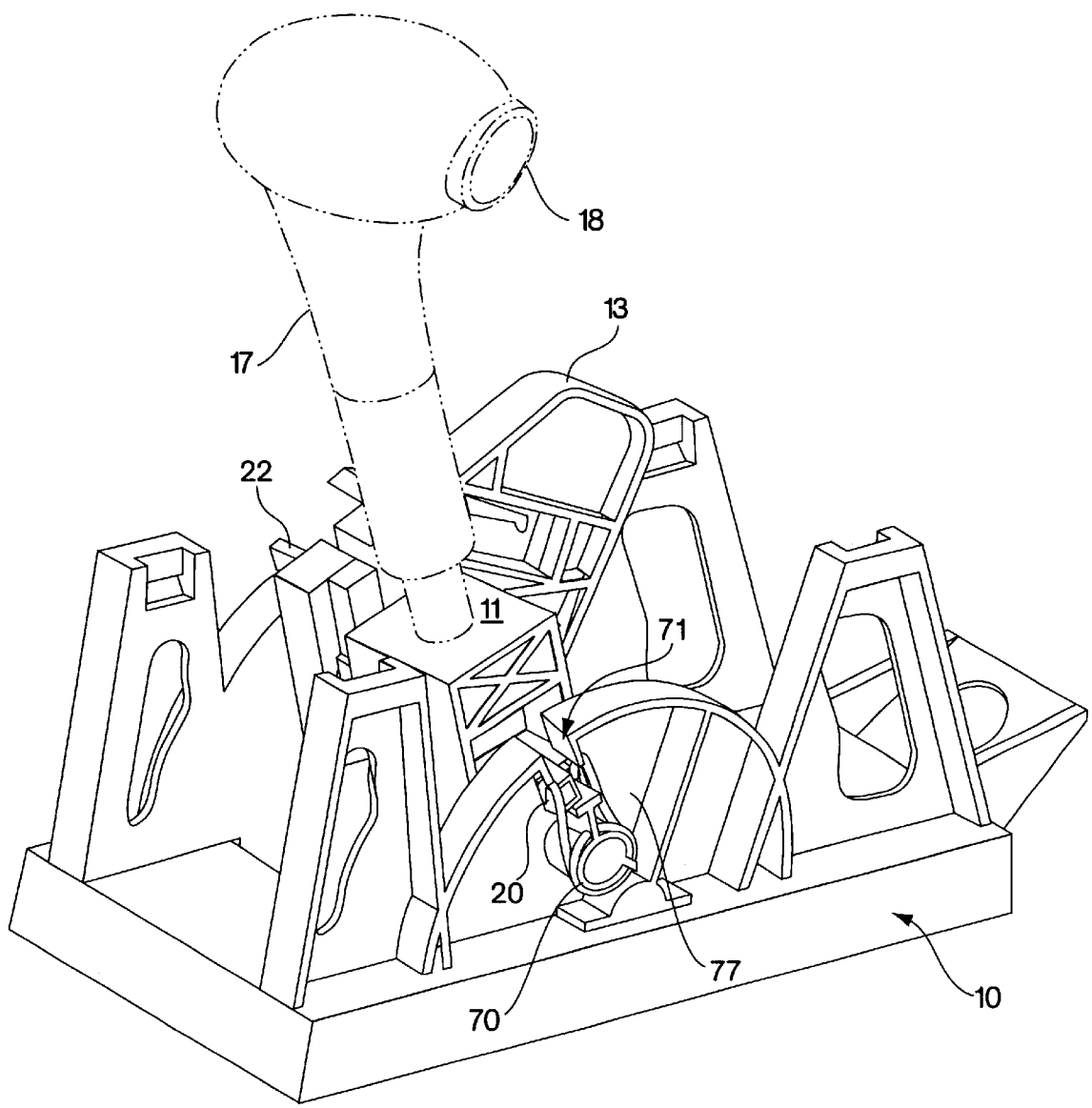
Figure 15:
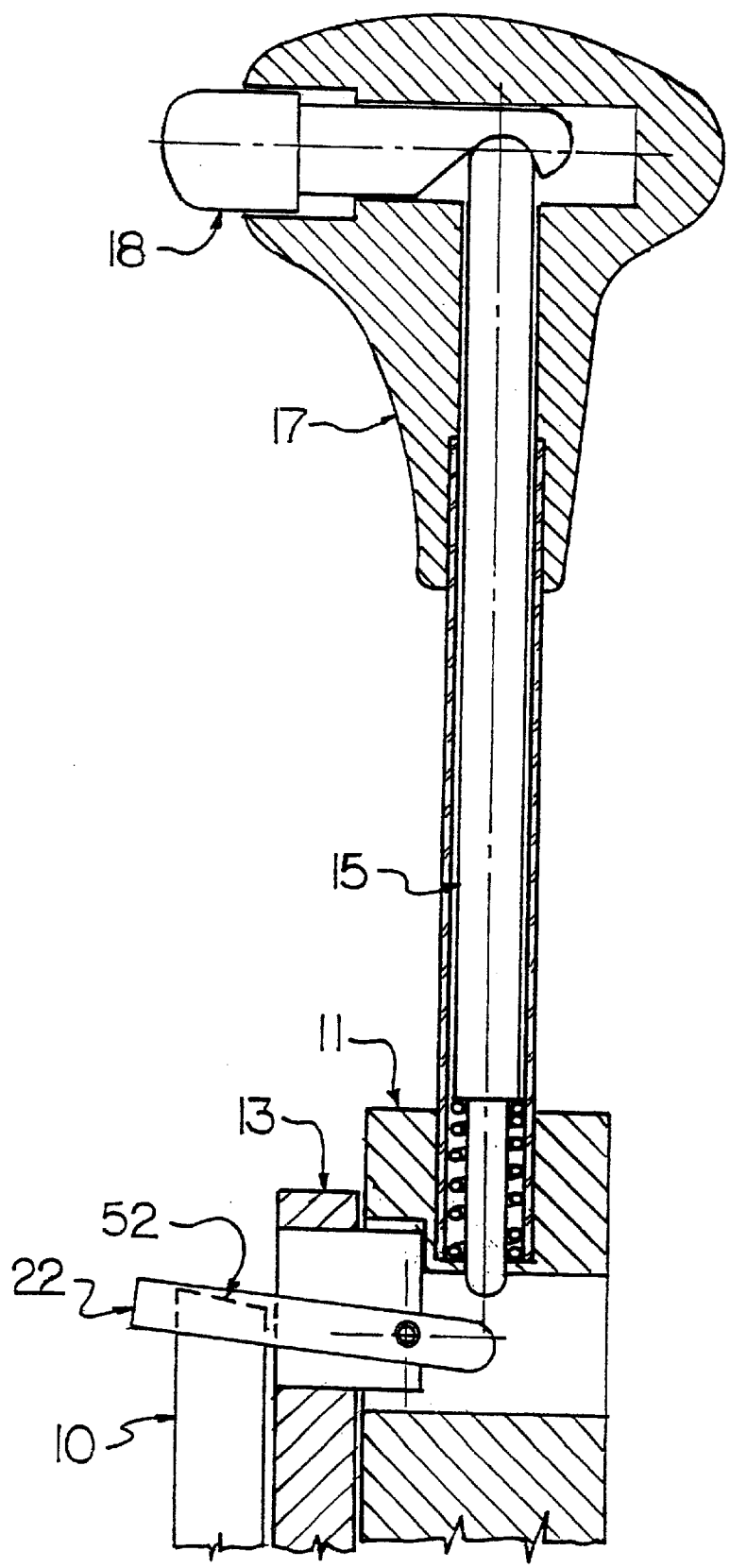
FIG. 15 is a cross-sectional view of a transmission shifter in accordance with the invention, showing an operative connection via a pushrod between a knob mounted on the shifter lever and the pawl mounted on the cable actuator.

FIGS. 11 and 12 illustrate movement of the lever 11 while in the electronic/manual mode of operation. Movement of the lever 11 causes position sensors to generate a signal the affects the operation (gear selection) of the transmission. By moving the lever 11 among various positions, the vehicle operator mimics the automotive performance conventionally associated with a clutch and manual transmission. See for example, FIGS. 15A–C for various alternative shift gate patterns in addition to the simple upshift-downshift shown in FIG. 1. When in a specified position such as drive or alternatively, neutral, the preventor post 20 of the shifter lever is free to move through the slot 71 in the wall 77 about the secondary axis. The shifter lever is releasably maintained/retained in position by a secondary tactile indicator 40, formed as a unitary projection of the control lever interacting with block 41. See FIG. 4.

In manual mode the control lever 11 and cable actuator 13 are disengaged thereby permitting the shifter lever to move about without affecting the position of the cable. For manual shift mode the shifter lever 11 is moved about its secondary axis of motion by snapping tactile indicator 40 laterally across the block 41 as discussed above. The lever 11 is once again retained in position by the secondary tactile indicator 40, sitting against block 41. The preventer post 20 engages the centering spring 70 located in the side of the base 10 as this snapping lateral motion is completed, e.g, refer to FIGS. 7 through 9. As the shifter lever moves to the side it disengages from both the cable actuator 13 and the pawl 22. The operator in manual mode is able to move the shifter lever 11 to select upshift (FIG. 11) or downshift (FIG. 12) and the centering spring 70 returns the lever to the rest position. To return to automatic mode, the vehicle operator moves the shifter lever back along the second pivot through the connecting gate 55, across the secondary tactile actuator 40, disengaging the centering spring 70 and re-engaging the cable actuator 13.

In addition to providing the vehicle operator the flexibility to use automatic or electronically controlled transmission, the instant invention is also desirable from an assembly and manufacturing perspective. In accordance with a highly advantageous feature of certain preferred embodiments, the inventive shifter assembly requires relatively few components and several of the required components can be fabricated by conventional plastic injection molding techniques. For example, by being molded as a unitary structure with certain adjoining components neither the preventer post 20 (shown in FIG. 4 unitary with a plastic portion of the shifter lever) nor the preventor wall 77 (shown in FIGS. 5–9 as unitary with the base 10) require any additional parts, thereby keeping part count and assembly time and error to a minimum. Further, assembly of the components can be performed manually or with relatively low cost equipment. The shifter components can be fabricated from conventional materials of construction such as injection molded plastics. While any suitable material can be employed, glass filled nylon is useful, e.g., 30% glass filled nylon. The components can be fabricated and assembled in accordance with conventional methods, e.g., injection molding and manual assembly.

Figure 13:
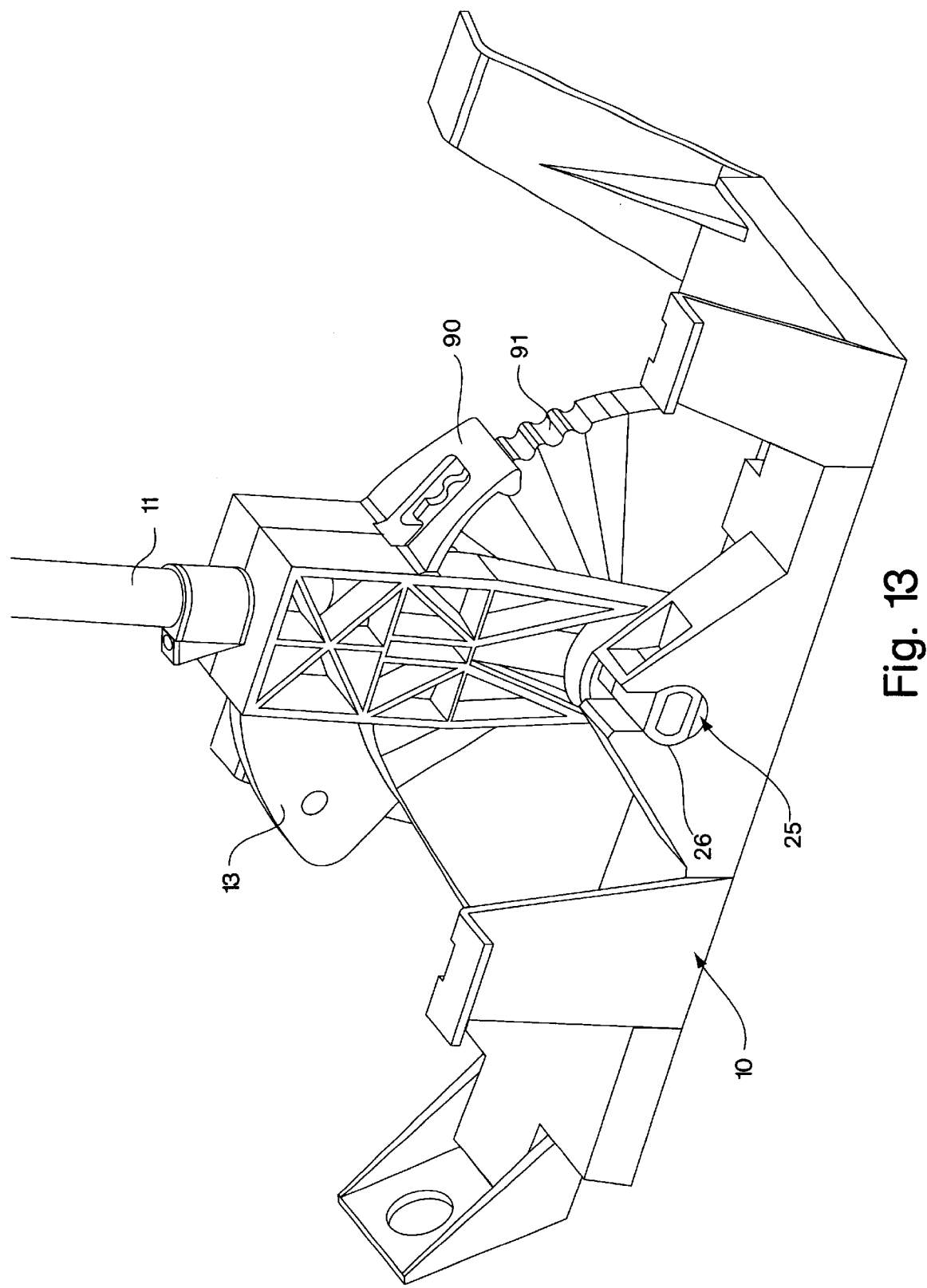
FIG. 13 illustrates another aspect of the interconnection between the pivot block and the base shown in FIG. 2.

FIG. 13 illustrates another aspect of the shifter illustrated in FIGS. 2 and 6. Lever 11 is mounted upon and around detents 91 of a detent surface. Lever 11 is mounted on pivot block 12 which in turn is mounted via extensions 26 within channels 25 of nose piece 14. A primary tactile indicator 90 engages detent 91. Similar to the aspect illustrated in FIG. 6, movement of the lever 11 (when the pawl, not shown, is released), a vibration caused by movement of indicator 90 along detent 91 is transmitted through the lever 11 to the vehicle operator. Movement of lever 11 also causes movement of cable actuator 13 which in turn causes movement of a cable that affects a change in transmission operation.

Figure 14:
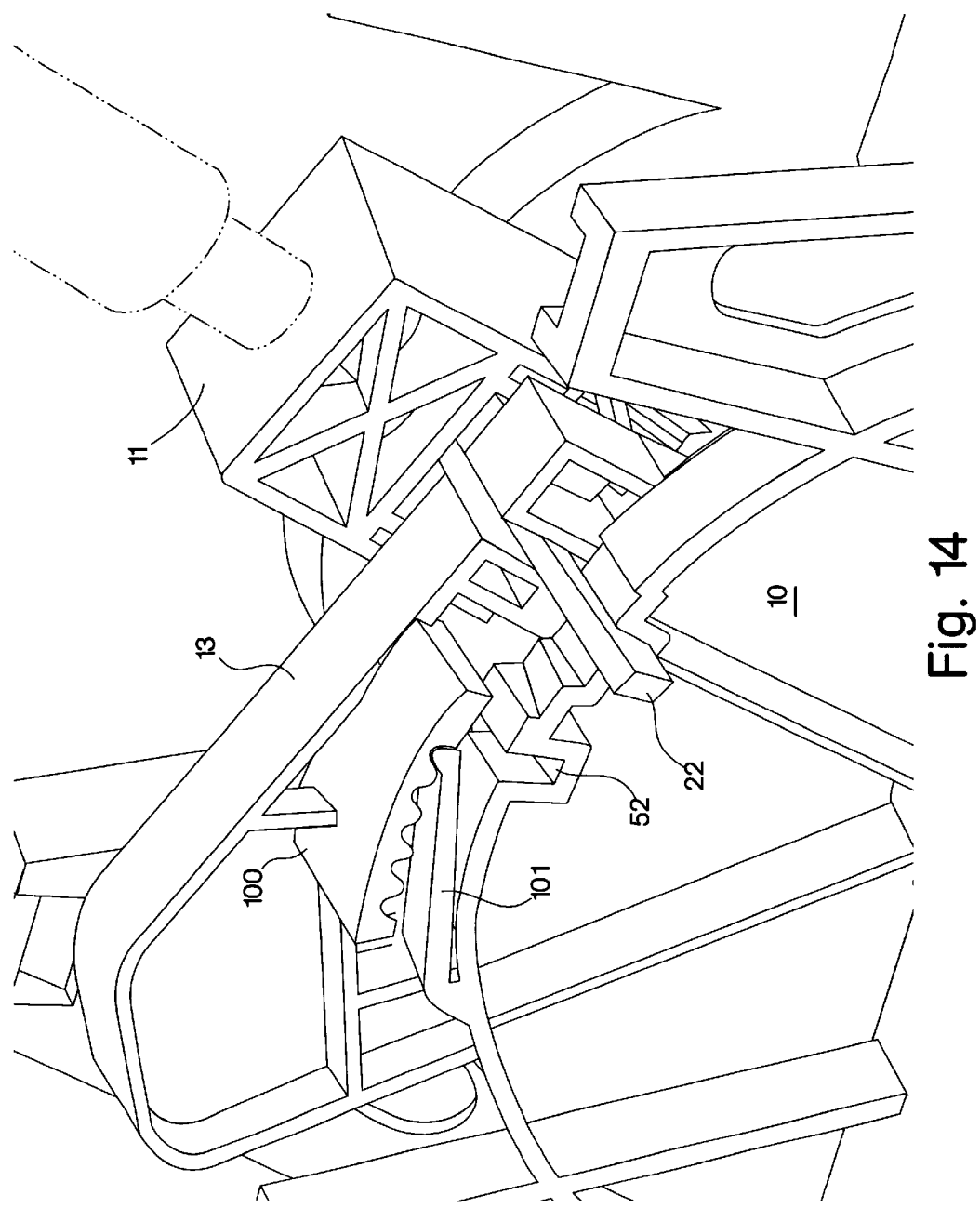
FIG. 14 illustrates an alternate preferred embodiment of the invention where the tactile indicator detents are formed unitary with the cable actuator and the tactile indicator is unitary with the base.

FIG. 14 illustrates an alternative preferred embodiment of the invention wherein detent 101 is formed unitary with base 10. The tactile indicator 100 is unitary with cable actuator 13. The term unitary is here to mean of one-piece construction. The shifter illustrated in FIG. 14 is operated in the manner described above in connection with FIGS. 6–11.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A transmission shifter comprising, in combination:
   a base having a detent surface provided with a series of detents;
   a cable actuator;
   a shifter lever operatively connected to the base, for controlling the transmission of a motor vehicle in both an automatic mode and a manual mode, movable along a first gear shift gate in automatic mode and a second gear shift gate in manual mode with the shift gates connected by a connecting gate; and
   a pawl mounted on the cable actuator, movable between an engaged position where the pawl engages the detent surface to a disengaged position where the pawl is free of the detent surface;
   wherein as the shifter lever moves along the first gear shift gate the cable actuator moves with the shifter lever, and the shifter lever moves independent of the cable actuator when the shifter lever moves along the second gear shift gate.

2. The transmission shifter of claim 1 further comprising a knob mounted on the shifter lever; and
   a pushrod operatively connected to the knob and to the pawl so that operation of the knob moves the pushrod which in turn moves the pawl to the disengaged position.

3. The transmission shifter of claim 1 wherein the shifter lever is movable along the first gear shift gate between a series of positions including at least a park position, a reverse position, a neutral position, and a drive position, and each of the positions corresponds to a respective detent of the detent surface.

4. The transmission shifter of claim 1 wherein the shifter lever in manual mode is centered by a centering spring.

5. The transmission shifter of claim 1 wherein the second gear shift gate is generally parallel to the first gear shift gate.

6. The transmission shifter of claim 1 further comprising at least one projection extending from and unitary with the cable actuator and engaging a corresponding opening in the shifter lever when the shifter lever is in the first gear shift gate.

7. The transmission shifter of claim 1 wherein the cable actuator is adapted to be connected to a cable.

8. The transmission shifter of claim 1 further comprising a preventor post which prevents the shifter lever from moving from the first gear shift gate to the second gear shift gate.

9. The transmission shifter of claim 8 wherein the connecting gate connecting the first gear shift gate to the second gear shift gate is positioned to coincide with the shifter lever positioned at one of a drive position and a neutral position.

10. A transmission shifter comprising, in combination:
    a base;
    a pivot block pivotable with respect to the base around a primary pivot and a secondary pivot generally perpendicular to the primary pivot;
    a shifter lever for gear change shifting movement, mounted on the pivot block, pivotable about a first axis with the pivot block and pivotable about a second axis independent of the pivot block;
    a cable actuator;
    a disengageable coupling element coupling the cable actuator with the shifter lever in a coupled position wherein the cable actuator pivots with the shifter lever along the first axis, and movable to an uncoupled position wherein the shifter lever is movable free of the cable actuator; and a protuberance on the pivot block which contacts a tab as the pivot block moves along the second pivot, producing a tactile sensation at the shifter lever.

11. The transmission shifter of claim 10 having an automatic mode where the shifter lever controls a motor vehicle transmission through operation of a cable, and an electronic mode where the shifter lever controls the motor vehicle transmission through electronic signals to the transmission.

12. The transmission shifter of claim 11 wherein the shifter lever is in automatic mode when the shifter pivots about the first axis, and the shifter lever is movable to the electronic mode after the shifter pivots out of the coupled position, about the secondary pivot.

13. The transmission shifter of claim 10 further comprising a tactile indicator formed unitary with one of the cable actuator and the base which rides over tactile detents on the other of the cable actuator and the base as the shifter lever pivots along the first axis, producing a tactile sensation at the shifter lever.

14. A transmission shifter comprising, in combination:

a base;

a pivot block pivotable with respect to the base around a primary pivot and a secondary pivot generally perpendicular to the primary pivot;

a shifter lever for gear change shifting movement, mounted on the pivot block, pivotable about a first axis with the pivot block and pivotable about a second axis independent of the pivot block;

a cable actuator;

a disengageable coupling element coupling the cable actuator with the shifter lever in a coupled position wherein the cable actuator pivots with the shifter lever along the first axis, and movable to an uncoupled position wherein the shifter lever is movable free of the cable actuator; and a detent surface provided with a series of detents and a pawl mounted on the cable actuator, movable between an engaged position where the pawl engages the detent surface to a disengaged position where the pawl is free of the detent surface.

* * * * *